US007806075B2

(12) United States Patent
Coeuret et al.

(10) Patent No.: US 7,806,075 B2
(45) Date of Patent: Oct. 5, 2010

(54) EQUIPMENT FOR ULTRAVIOLET CROSSLINKING IN A CONTROLLED ATMOSPHERE

(75) Inventors: François Coeuret, Guyancourt (FR); Géraldine Rames-Langlade, Viroflay (FR); Andrea Spizzica, Cernusco Sul Naviglio (IT)

(73) Assignee: L'Air Liquide, Société Anonyme a Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 1037 days.

(21) Appl. No.: 10/586,102

(22) PCT Filed: Jan. 24, 2005

(86) PCT No.: PCT/FR2005/050040

§ 371 (c)(1), (2), (4) Date: Jul. 14, 2006

(87) PCT Pub. No.: WO2005/075111

PCT Pub. Date: Aug. 18, 2005

(65) Prior Publication Data

US 2007/0109333 A1 May 17, 2007

(30) Foreign Application Priority Data

Jan. 28, 2004 (FR) .................................. 04 50155

(51) Int. Cl.
*B05B 5/00* (2006.01)
*B05C 11/00* (2006.01)
*F26B 3/34* (2006.01)
*B01J 19/08* (2006.01)

(52) U.S. Cl. ......................... 118/643; 118/642; 118/62; 34/267; 34/218; 34/242; 422/186.3; 422/186.05; 422/186.14

(58) Field of Classification Search .................. 118/58, 118/62, 63, 66–68, 641–643, 326, 634, 50, 118/DIG. 7; 34/242, 218, 266–268; 422/186.05, 422/186.3, 186.04
See application file for complete search history.

(56) References Cited

U.S. PATENT DOCUMENTS 3,931,684 A * 1/1976 Turnbull et al. ............... 34/242
4,135,098 A 1/1979 Troue
4,411,075 A 10/1983 Blaudszun (Continued)

FOREIGN PATENT DOCUMENTS

DE 35 01 684 7/1986

(Continued)

OTHER PUBLICATIONS

International Search Report for PCT/FR2005/050040.

*Primary Examiner*—Yewebdar T Tadesse
(74) *Attorney, Agent, or Firm*—Donna Blalock Holguin

(57) ABSTRACT

The invention concerns an installation wherein is performed a crosslinking operation for a coating such as an ink or a varnish through ultraviolet radiation or electronic beam, in the presence of a gas mixture with controlled oxygen residual content. The installation comprises a chamber including one or more UV lamps or a source of accelerated electrons, required for performing the crosslinking operation, and is characterized in that it comprises an input device adjacent the chamber comprising at least the following three components, viewed successively by the product moving to be treated: a labyrinth system, means for injecting an inert gas forming a gas knife and a channel.

14 Claims, 7 Drawing Sheets

U.S. PATENT DOCUMENTS

| | | | | |
|---|---|---|---|---|
| 4,606,137 | A | 8/1986 | Whipple | |
| 4,622,762 | A | 11/1986 | Reed | |
| 6,185,840 | B1 | 2/2001 | Bolte et al. | |
| 6,458,330 | B1 * | 10/2002 | Cocolios et al. ........ | 422/186.05 |

FOREIGN PATENT DOCUMENTS

| | | |
|---|---|---|
| FR | 771 362 | 10/1934 |
| FR | 1 330 283 | 6/1963 |
| GB | 713 612 | 8/1954 |
| WO | WO 00 14468 | 3/2000 |
| WO | WO 02 40738 | 5/2002 |

* cited by examiner

EQUIPMENT FOR ULTRAVIOLET CROSSLINKING IN A CONTROLLED ATMOSPHERE

FIELD OF THE INVENTION

The invention relates to installations in which operations requiring control of the atmosphere inside a chamber are carried out and relates in particular to the field of operations for crosslinking a coating (for example an ink or varnish coating) by ultraviolet radiation (UV curing) or by an electron beam in the presence of a controlled atmosphere, usually an inert gas mixture, for example based on nitrogen, $CO_2$, argon, etc., or mixtures of such gases.

BACKGROUND

It should be recalled that the use of conversion products curable (crosslinkable) by UV radiation or an electron beam (EB) such as adhesives, protective varnishes, lacquers, inks and paints, is widely used at the present time in printing and surface varnishing. This is because, compared with conventional products based on organic and aqueous solvents, these products have advantages from the technical standpoint (rapid crosslinking, little material shrinkage, quality of the end-product and easy cleaning of the printing plates) and from the environmental standpoint (100% solids content resins and lower energy consumption).

Since the crosslinking step has to be carried out on an industrial scale continuously, 24 hours a day, the chamber having one or more UV lamps is an open system. Consequently, the crosslinking mechanism that takes place in the zone irradiated by the UV lamp is carried out in the atmospheric air. This step is carried out in industrial plants with run speeds ranging from 10 to a few hundred m/min depending on the application.

Most products that crosslink by UV radiation are radical systems. The formulation contains, in addition to the base chemical constituents, such as a prepolymer, a reactive diluent and additives, a photoinitiator (PI). Under the action of UV, this photoinitiator generates free radicals (step a) that will initiate the radical polymerization reactions according to the various steps described in scheme 1 below. The radicals (R*) react with the reactive functional groups (M) of the prepolymer and of the diluent, and initiate the polymerization reaction (step b). Since the reactive functional groups are both contained in the prepolymer and the diluent, the propagation (step c) of the polymerization reaction develops in three dimensions. In this way, termination (step d) of the polymer chain results in a highly crosslinked polymer network ($R(M)_n$).

Scheme 1: UV resin radical photopolymerization reactions

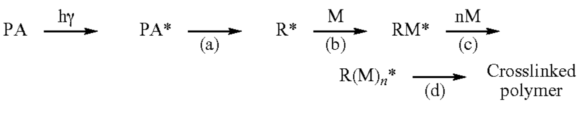

At the present time, the industrial ultraviolet equipment operates in open system and these radical photopolymerization reactions take place in the atmospheric air. Now, all the radicals (R*, RM* and $R(M)_n$*) involved in the crosslinking process are highly reactive with respect to oxygen in the air. These radicals react with the oxygen to form peroxides ($RO_2$*) and hydroperoxides (ROOH), thus reducing the effectiveness of the radical photopolymerization reactions (see scheme 2 below). Oxygen interferes at various levels of the chemical mechanism described above, with the effect of reducing the quantity of free radicals (step a), preventing the initiation of the polymerization (step b) and prematurely terminating the formation of polymer chains (step d).

These phenomena occur with oxygen initially present in the formulation and with the atmospheric oxygen that diffuses during UV exposure through the film of the UV resin. Oxygen can thus retard or completely inhibit the radical polymerization reaction. The inhibiting effect of oxygen is all the more pronounced when the thickness of the UV resin layers is small.

Scheme 2: $O_2$ inhibition reactions (DH is the diluent or the prepolymer)

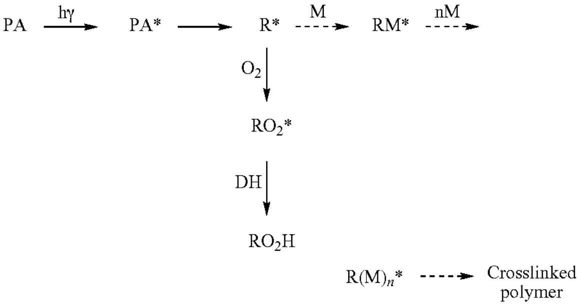

The practical consequences of these phenomena are:

- no polymerization of the UV-coating;
- formation of short chains, and therefore a film of ink, adhesive or varnish of mediocre quality;
- formation of quality-detracting labile oligomers (appearance, odor, health problems if food contacts with the substrate for example); and
- formation of peroxides ($RO_2$*) and hydroperoxides ($RO_2H$) partly responsible for yellowing of the product.

The importance of the atmosphere composition inside a chamber for the UV crosslinking of resins, and more particularly the absence of oxygen in the UV zone, is therefore well understood. Consequently, it is essential for certain applications to have equipment capable of considerably reducing the oxygen concentration inside a UV chamber, and more specifically in the zone where the radical photopolymerization reactions take place. This equipment should allow the step of curing the UV resins to be optimized.

A number of existing solutions for remedying the drawbacks associated with the presence of oxygen when crosslinking UV resins may be listed.

A first solution consists in increasing the intensity of the UV lamps so as to increase the production of free radicals (according to reaction (a), scheme 1). These radicals, produced in larger quantity, react with oxygen present in the reaction zone and reduce the oxygen concentration of the chamber and therefore the inhibiting effect of oxygen.

This solution, although easy to implement, results in a higher consumption of electricity and therefore a not insignificant additional energy cost since the power of the lamps used is usually about 20 kW. Moreover, increasing the intensity of the lamps will raise the temperature inside the chamber (reaction zone) and therefore runs the risk of thermally degrading the coating.

A second solution consists in introducing into the formation large quantities of photoinitiators and molecules (synergists), the role of which is to react, and therefore remove, the oxygen present in the reaction zone. Even though these products are increasingly effective, it is estimated that, in current formations, 80% of the photoinitiators and of the synergists react with oxygen, and therefore destroy it, while the remaining 20% are used to crosslink the UV resins.

However, these chemical substances constitute the most expensive part of the formation and, in addition, they may be harmful and their use may cause yellowing of the crosslinked resin and a very strong odor.

Finally, a third solution consists in removing the residual oxygen present in the reaction zone and in replacing this oxygen with an inert gas, such as nitrogen. This solution means that the chamber—an open system, where the resin crosslinking takes place—has to be modified and equipped with a device for operating in an inert controlled atmosphere. The UV crosslinking of resins in a controlled nitrogen atmosphere has many advantages since the absence of oxygen in the UV zone makes it possible to increase the crosslinking rate, to reduce the light intensity of the UV lamps or the number of UV lamps used, to reduce the quantity of photoinitiators and synergists introduced into the formulation, and to reduce the formation of by-products (such as peroxide and hydroperoxides), while still obtaining an end-product of very high quality.

Moreover, it should be pointed out that such working conditions in an inert atmosphere have the advantage of limiting the formation of ozone in the chamber.

Document WO 00/14468 for example has proposed equipment for operating with about 50 ppm of residual oxygen in the reaction zone, with speeds reaching several hundreds of meters per minute. This equipment is characterized by the presence of two gas injection units placed at the entry and exit of the UV chamber. Each of these units comprises two gas injection systems. The first injection system, placed at the ends of the chamber, has the function of preventing any air from entering the chamber, while the second injection system, placed inside the chamber, has the function of filling the chamber with nitrogen. The first injection system is a slot oriented in such a way that the stream of gas is directed toward the outside of the chamber. The second injection system is a tube possessing pores oriented so that the stream of gas is directed toward the inside of the chamber. The width of the slot and the orientation angles of the two injection systems can be modified and depend on the operating conditions.

However, the gas volumes needed for a low residual oxygen concentration for operation at the speeds used are very high (or even very considerable). As an example, at 200 m/min, the quantity of nitrogen must be 140 $Sm^3/h$ for a concentration of less than 50 ppm. In addition, the discharge of a large quantity of nitrogen to the outside of the UV chamber in the working zone requires an effective extraction system in order to avoid any risk of asphyxia by anoxia.

It may also be pointed out that the Applicant has proposed, in document WO 02/40738, equipment for controlling and managing the gases during operations requiring control of the atmosphere inside a chamber. The operations intended by that prior document were especially electrical-discharge surface treatments at atmospheric pressure in the presence of a gas mixture and in a controlled atmosphere, or else operations of the UV curing and EB curing type. According to this prior work, the recommended equipment comprises:

- entry and exit devices adjacent the chamber in order to prevent air from entering the chamber and to prevent gaseous effluents exiting therefrom, respectively;
- an extraction device comprising a line opening into the chamber; and
- means for regulating the flow of gas extracted by said extraction device so as to maintain an approximately zero pressure difference between the inside of the chamber and the surrounding atmosphere.

Each of the entry and exit devices typically consist (see FIG. 1 below; the reader may also refer to FIG. 2 of said document WO 02/40738) of three components positioned in series and seen in succession by the treated substrate, namely a channel, a gas injection slot and a “labyrinth”. The concept of a “labyrinth” is explained in detail in this prior document, and relates in fact to a system of open grooves facing the internal space (gap) of the entry (or exit) device in question (through which gap the substrate to be treated runs) and forming a labyrinth.

The channel, separated from the gas injection slot by a partition, is open facing the internal space of the entry or exit device in question.

The gas (nitrogen) injected through the slot allows the entrained air boundary layer on the surface of the film to be detached. This is because the labyrinth, by creating an overpressure zone (large pressure drop) in the direction in which the film runs, forces the nitrogen to flow toward the upstream, that is to say into the channel. This phenomenon is favored by a lower pressure drop in the channel. This turbulence in the channel creates a zone of slight underpressure on the surface of the film, which detaches the air boundary layer located at the surface of the film. The stream of nitrogen in the channel then becomes a laminar flow and forms a piston effect that opposes the stream of air, pushing it back. The combination of these three elements (channel, nitrogen knife, labyrinth) makes it possible, at the inlet, to prevent air from entering the chamber while minimizing the consumption of nitrogen. The same labyrinth seal placed at the outlet makes it possible to prevent the gaseous effluents from leaving the chamber.

This equipment proves to be remarkably effective since it allows a film surface treatment to be carried out in the presence of an oxygen concentration not exceeding 50 ppm with acceptable nitrogen volumes.

The use of this prior equipment for reducing the oxygen concentration during the crosslinking of coatings by UV radiation has of course been envisaged. However, it is clearly apparent that, for at least the following reasons, this equipment is not optimized for meeting this technical objective: firstly, the UV crosslinking method does not include a surface treatment and therefore does not require a nitrogen-based treatment gas to be injected into the chamber. But secondly, the absence of harmful gaseous effluents formed in the UV zone makes it unnecessary to use a central extraction system for removing them, which extraction system is, as a consequence, generally absent from such installations.

It is therefore apparent that substantial modifications of this prior equipment be recommended in order to meet this new technical problem.

SUMMARY OF THE INVENTION

The present invention relates to an installation in which an operation of crosslinking a coating, such as an ink or varnish coating, is carried out by ultraviolet radiation or by an electron beam, in the presence of a gas mixture with a controlled residual oxygen content, the installation comprising a chamber having one or more UV lamps or a source of accelerated electrons, necessary for carrying out the crosslinking operation, which is characterized in that the installation includes an entry device adjacent the chamber and comprising at least the following three components, seen in succession by the running product to be treated: a labyrinth system, means for injecting an inert gas forming a gas knife, and a channel.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

As an illustration, a trial was carried out for controlling the atmosphere on an industrial prototype of the type shown in FIG. 1, under the conditions given below. In everything that follows, the volumes will be expressed as standard liters per $m^2$ of treated substrate (and not, as is conventional, in $m^3/h$). This is very advantageous for being able to compare machines of different widths.

The operating conditions adopted were therefore the following:

- the presence of entry/exit devices based on three components (channel, injection slot and labyrinth) as described above in relation to FIG. 1;
- no treatment gas injection into the chamber; and
- the central extraction system was stopped, as was the pressure regulation system.

Figure 4:
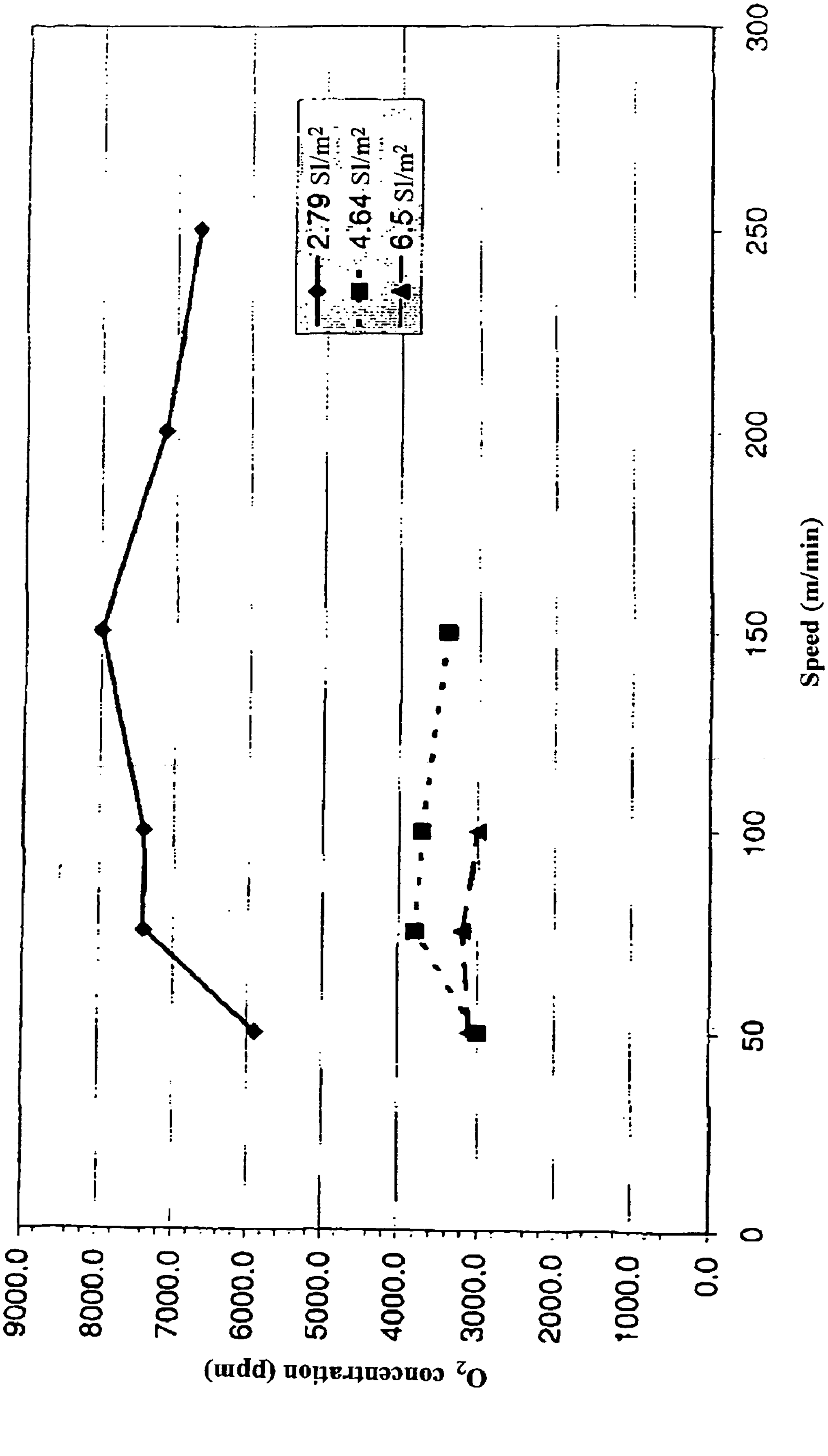
FIG. 4 illustrates the results such as those obtained with equipment of the prior art provided with entry and exit devices according to FIG. 1.

Under such operating conditions, the trials consisted in measuring the oxygen concentration inside the chamber and at about 0.8 mm from the surface of the roll, by injecting about 1.4 $Sl/m^2$ of nitrogen into each entry/exit device, with a 700 mm wide product running at speeds of between 50 and 250 m/min. The results of the measurements showed that the oxygen concentration was between 6000 and 8000 ppm depending on the speed used (these results are shown in FIG. 4 below). By using higher nitrogen volumes (3.25 standard liters/$m^2$ in each entry/exit device). It was possible to reduce this concentration to about 3000 ppm.

The results clearly show that the use of these prior devices does not achieve a residual oxygen concentration low enough for many envisaged applications. In particular it may be seen that, even by having eliminated the reduced pressure inside the chamber, created by the central extraction, the performance of these systems is insufficient under the operating conditions tested (especially the run speed).

One hypothesis that may be put forward is that this result can be explained by the absence of injection of the treatment gas mixture into the chamber, which helps to achieve a low oxygen concentration, the injection of the treatment mixture having been stopped for these trials (very logically, since the intended application here is a UV crosslinking application).

The object of the invention is therefore to propose novel ultraviolet or electron-beam crosslinking equipment, the design of which allows the oxygen concentration within the chamber to be substantially reduced.

The equipment according to the invention is based on the use of two devices, a chamber entry device and a chamber exit device (see FIG. 2 below):

- the entry device consists of at least the following three components, seen in succession by the running product to be treated: a labyrinth system, a gas injection slot, and a channel;
- the chamber exit device advantageously consists of at least the following three components, seen in succession by the running product to be treated: a channel, a gas injection slot, and a labyrinth system.

As an illustration, the following geometric values in particular are considered satisfactory:

- height of the labyrinth grooves: 4.5 mm;
- width of the labyrinth teeth: 2 mm;
- width of the labyrinth grooves: 5 mm;
- height of the channels: 3 mm; and
- length of the channels: 38 mm.

The length of the channel preferably satisfies the following rule:

length=6×height of the channel.

The height of the channel is advantageously between 3 and 5 mm.

In this configuration (arrangement and geometry of the components), the chamber entry device may be considered to have two functions: owing to the pressure drop created by the inlet labyrinth, the injected nitrogen has a tendency to be directed toward the inside of the crosslinking chamber and to very considerably minimize the entry of air into this chamber. The same applies to the chamber exit device, which allows nitrogen to be directed toward the chamber and to limit a discharge of gas to the outside.

In what has just been described above, it should be emphasized that the entry device plays a key role, whereas the exit device, if it were to be shut off or at the very least simplified in its structure for certain less demanding applications (as will be seen below), its presence is strongly recommended so as to work under optimum atmosphere conditions.

The present invention therefore relates to an installation in which an operation of crosslinking a coating, such as an ink or varnish coating, is carried out by ultraviolet radiation or by an electron beam, in the presence of a gas mixture with a controlled residual oxygen content, the installation comprising a chamber having one or more UV lamps or a source of accelerated electrons, necessary for carrying out the crosslinking operation, which is characterized in that it includes an entry device adjacent the chamber and comprising at least the following three components, seen in succession by the running product to be treated: a labyrinth system, means for injecting an inert gas forming a gas knife, and a channel.

Moreover, the installation according to the invention may have one or more of the following features:

- the installation includes an exit device adjacent the chamber and consisting of at least the following three components, seen in succession by the running product to be treated: a channel (“output channel”), means for injecting an inert gas forming a gas knife, and a means for creating a pressure drop, such as a smooth profile, the distance between the smooth profile and the surface of the coating being less than the height of said channel;

the installation includes an exit device adjacent the chamber and consisting of at least the following three components, seen in succession by the running product to be treated: a channel, means for injecting an inert gas forming a gas knife, and a labyrinth system;

said entry device includes at least the following five components, seen in succession by the running product to be treated: a channel, a 1st gas injection slot, a labyrinth, a 2nd gas injection slot, followed by a second channel;

said means for injecting inert gas forming a gas knife comprise a plane-walled gas injection slot emerging inside the entry or exit device in question; and the length/height ratio of at least one of said channels is at least 3, preferably at least 6.

The concepts of "labyrinth" and "channel" according to the present invention refer to the "labyrinth" and "channel" concepts already used in the prior document WO 02/40738 discussed above, again in the name of the Applicant.

Therefore, as clearly depicted in the figures below, the "labyrinth" concept relates to a system of open grooves facing the internal space of the entry or exit device in question and forming a labyrinth.

Figure 2:
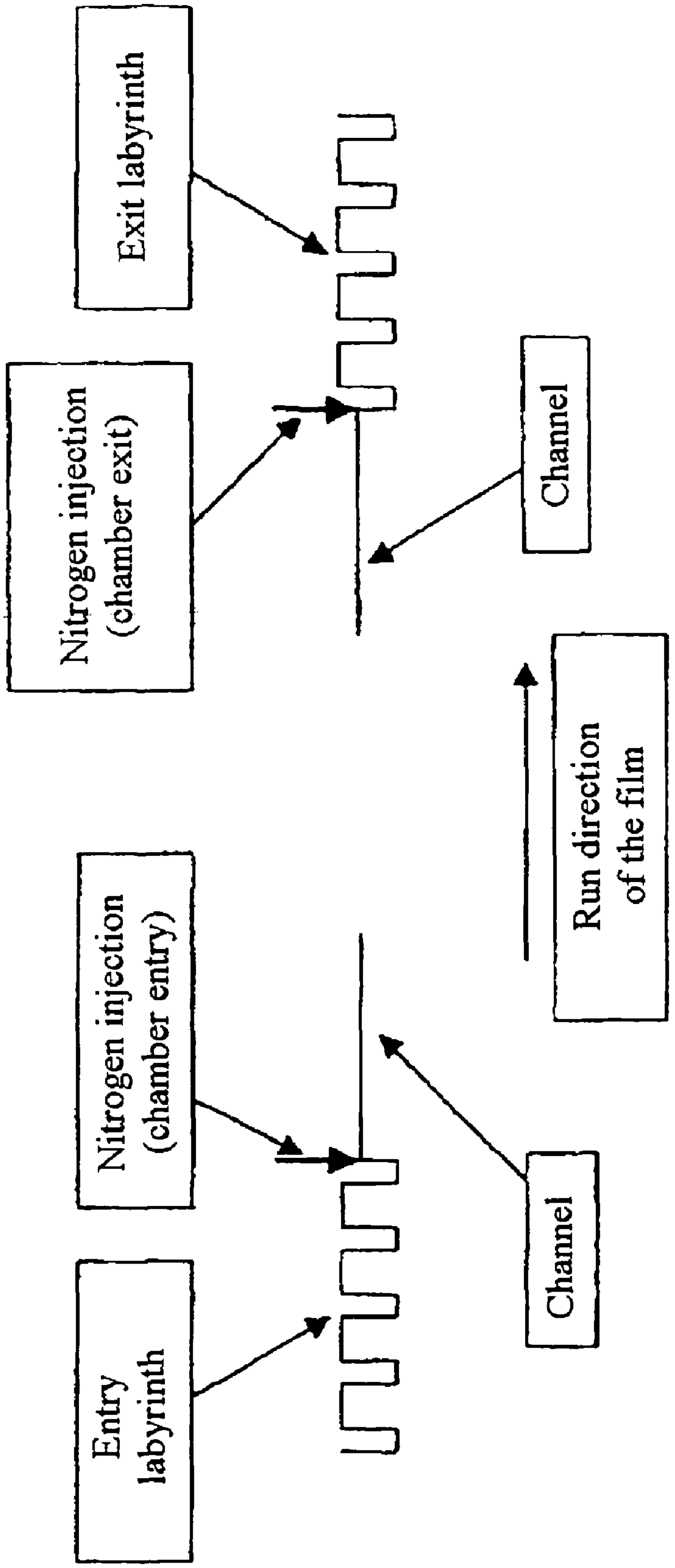
FIG. 2 illustrates a chamber entry device and a chamber exit device according to the present invention.
Figure 3:
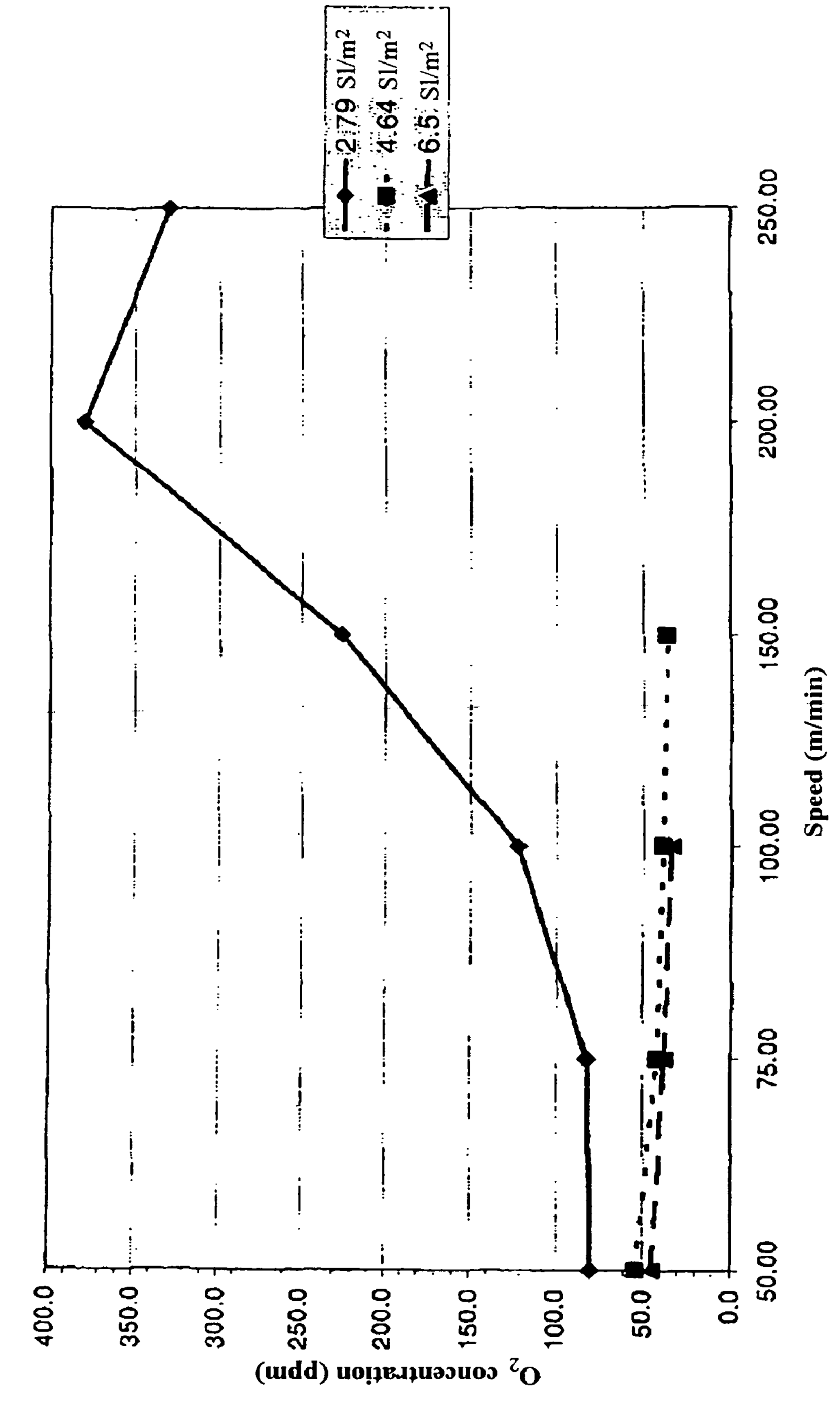
FIG. 3 illustrates shows the result of trials carried out on equipment according to the invention comprising the entry/exit systems described within the context of FIG. 2.

FIG. 3 below shows the result of trials carried out on equipment according to the invention comprising the entry/exit systems described within the context of FIG. 2, which trials consisted in measuring the oxygen content within the chamber, about 5 mm from the treated roll, for speeds of between 50 and 250 m/min and with nitrogen injected into each of the entry/exit devices at about 1.4 to 3.25 standard liters/$m^2$ (the abbreviation Sl/$m^2$ used in the figures must be understood as actually denoting standard liters/$m^2$ of substrate treated).

In FIG. 3, it should be noted that there are three curves:

the curve of ♦ points for an overall (entry+exit) volume of about 2.8 standard liters/$m^2$;

the curve of ■ for an overall (entry+exit) volume of about 4.64 standard liters/$m^2$; and the curve of ▲ points for an overall (entry+exit) volume of about 6.5 standard liters/$m^2$.

The results of the measurements show that the oxygen content varies from about 34 to 380 ppm depending on the speed and nitrogen flow rate conditions employed.

These trials demonstrate that an inert nitrogen atmosphere containing less than 50 ppm residual oxygen was obtained in the chamber of the equipment according to the present invention with a very acceptable gas consumption, since this was between 4.6 and 6.5 standard liters/$m^2$.

This improvement over the abovementioned existing solutions is very significant.

Figure 1:
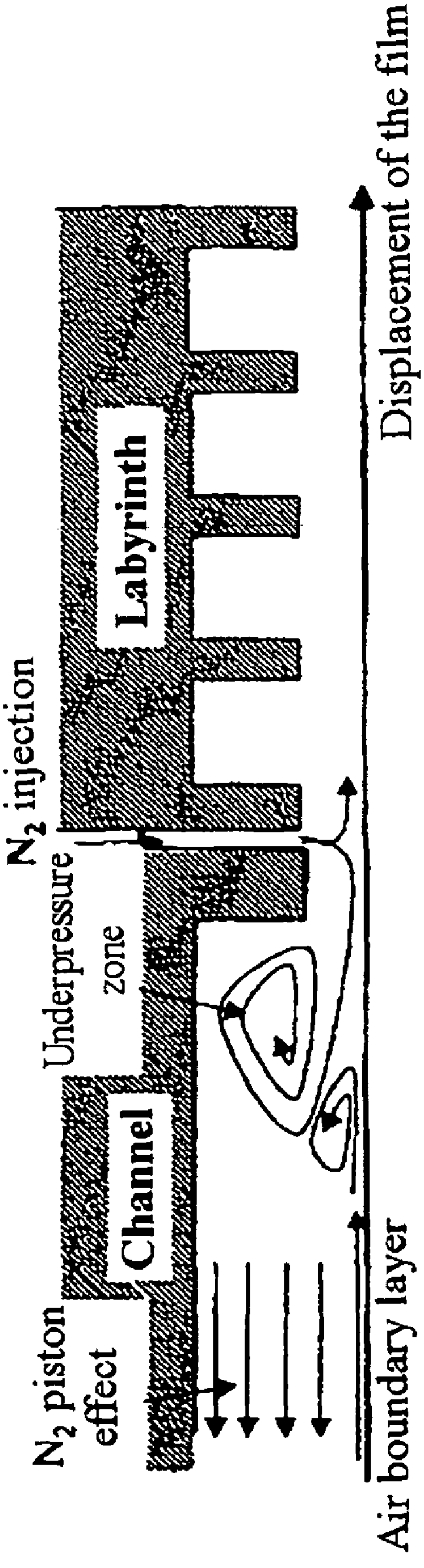
FIG. 1 illustrates entry and exit devices.

Thus, FIG. 4 shows the results, already mentioned above, such as those obtained with equipment of the prior art provided with entry and exit devices according to FIG. 1.

In FIG. 4, it should be noted that there are three curves:

the curve of ♦ points for an overall (entry+exit) volume of about 2.8 standard liters/$m^2$;

the curve of ■ points for an overall (entry+exit) volume of about 4.6 standard liters/$m^2$; and the curve of ▲ points for an overall (entry+exit) volume of about 6.5 standard liters/$m^2$.

As has already been mentioned above, these measurement results show that the oxygen concentration is between 6000 and 8000 ppm, depending on the speed used, for an overall volume of 2.8 standard liters/$m^2$. The use of higher nitrogen volumes (3.25 standard liters $m^2$ in each entry/exit device, i.e. an overall volume of 6.5 standard liters/$m^2$) allows this concentration to be reduced to about 3000 ppm.

Figure 5:
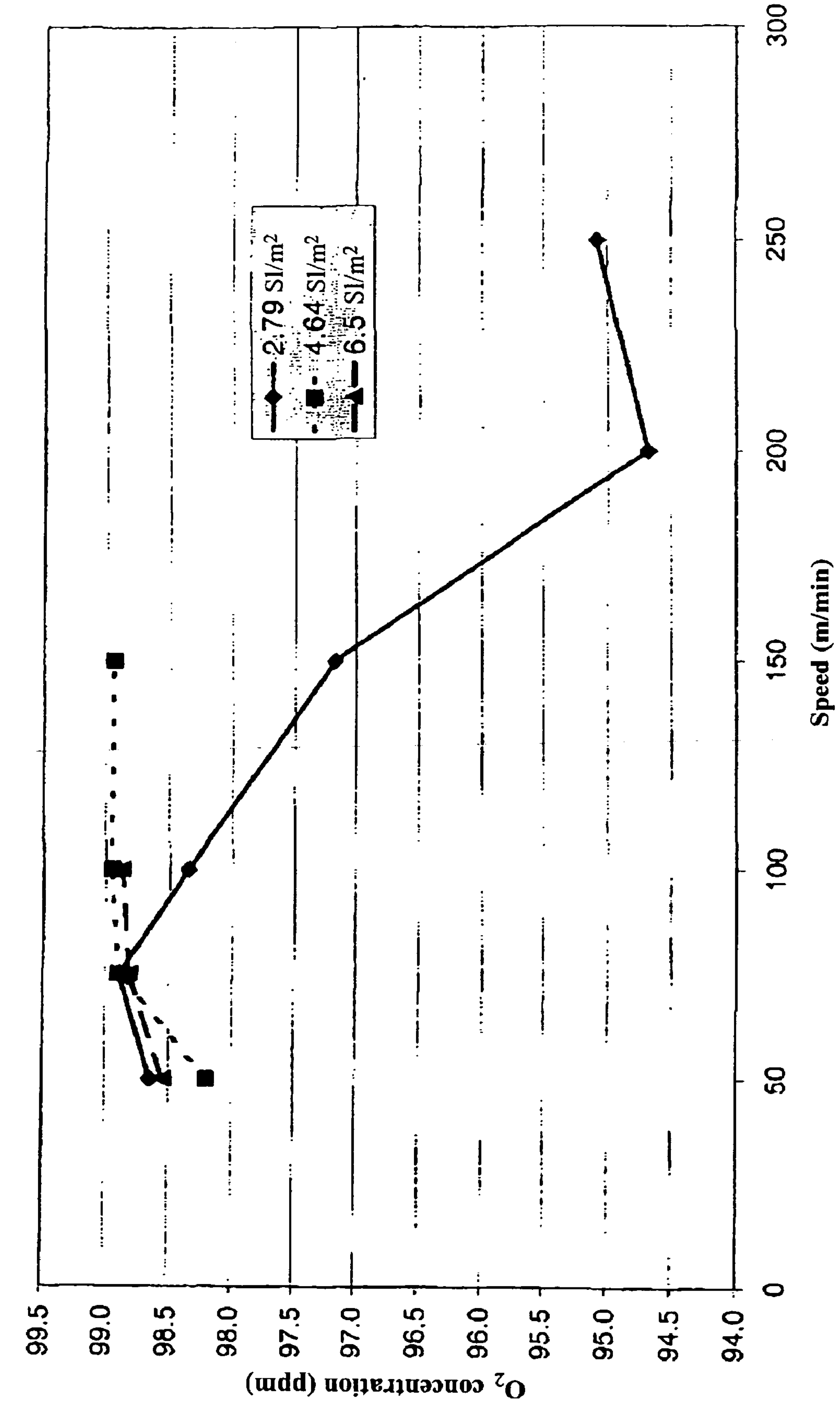
FIG. 5 illustrates a comparison of the results obtained in the case of FIG. 3 with those obtained in the case of FIG. 4.

FIG. 5 shows a comparison of the results obtained in the case of FIG. 3 with those obtained in the case of FIG. 4. Plotted on the y axis is the oxygen content reduction (in %) achieved thanks to the equipment according to the invention.

The oxygen content reduction $dO_2/O_2$ expressed as a percent is defined by the following equation:

$$dO_2/O_2=(([O_2]_{fig.\,4}-[O_2]_{fig.\,3})/[O_2]_{fig.\,4})\times 100.$$

It may therefore be seen that the reduction in residual oxygen content in the chamber is at least 94% with the same speed and nitrogen volume parameters. It even reaches 98 to 99% in the case of higher volumes.

Figure 6:
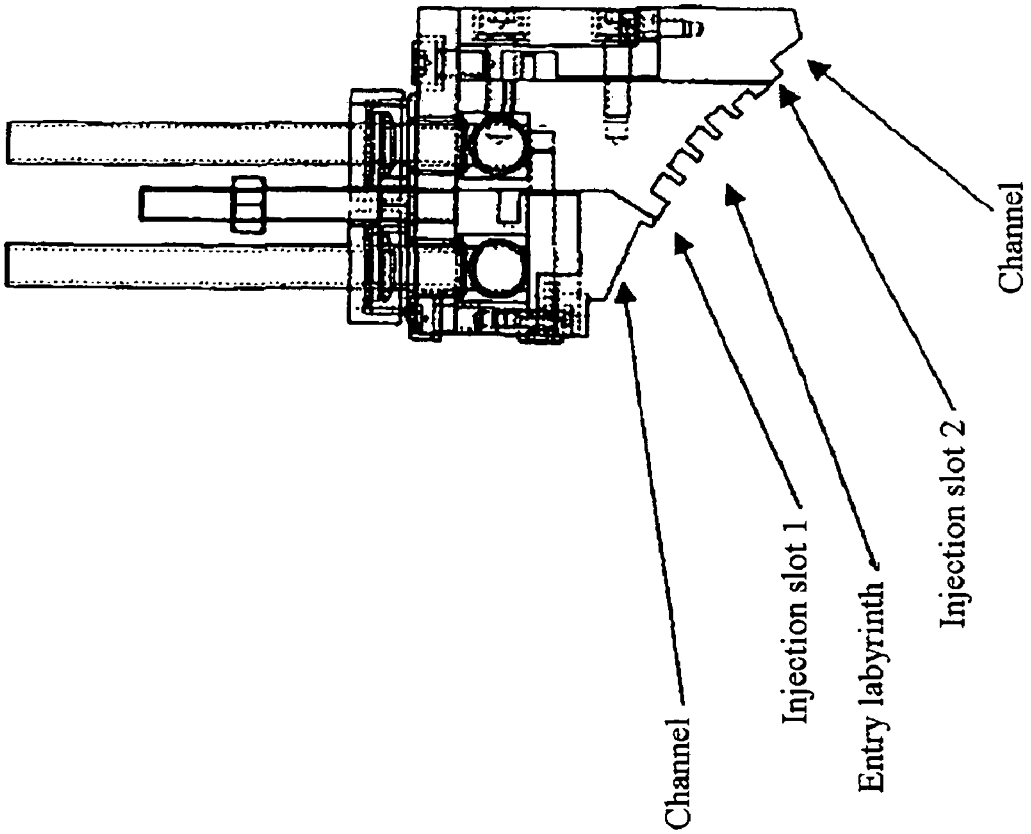
FIG. 6 illustrates a modification of the chamber entry device.
Figure 7:
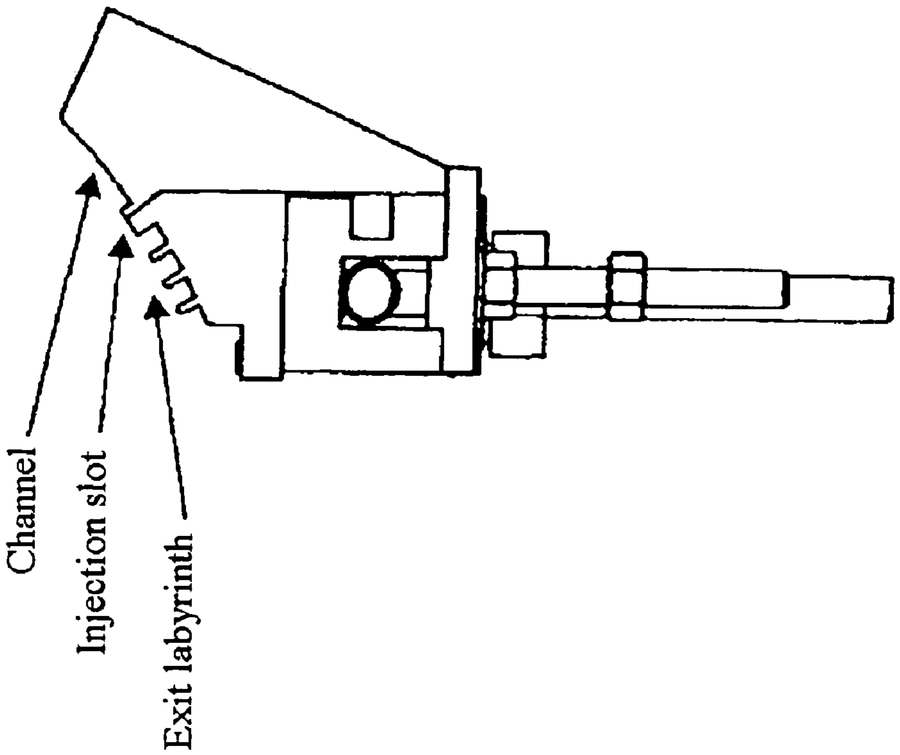
FIG. 7 illustrates the chamber exit device.

FIGS. 6 and 7 illustrate another configuration of the equipment according to the invention.

In this configuration, the chamber entry device (shown in FIG. 6) has been modified—it consists here of five components, namely in succession: a channel, a first gas injection slot, a labyrinth, a second gas injection slot, followed by another channel.

As regards the chamber exit device (FIG. 7), this is identical to that of FIG. 2, so as to consist of three successive components, namely a channel, a nitrogen injection slot, followed by a labyrinth.

The orientation of the nitrogen injection slots to the roll is, in the case of the embodiment shown, about 90° for the first slot of the entry device and 45° in the case of the second slot of the entry device. The width of the slots is about 0.2 mm for the first slot and 0.4 mm for the second slot, respectively. The distance between the entry device and the roll is about 0.8 mm.

The orientation of the nitrogen injection slot of the exit device is about 90° to the roll and its width about 0.3 mm. The distance between the exit device and the support roll is about 0.8 mm.

The configuration illustrated by this embodiment makes the detachment of the air boundary layer located at the surface of the film to be even more effective (compared with the configuration described previously in conjunction with FIG. 2), and therefore provides greater insurance that the air conveyed to the surface of the film will not penetrate the treatment chamber.

In fact, the entry device of FIG. 6 may be considered as a combination of the entry devices of FIG. 1 and FIG. 2:

the first injection slot, owing to its position upstream of the labyrinth, tends to direct the gas toward the upstream and therefore to suppress the intake of air;

the second injection slot, owing to its position downstream of the labyrinth, tends to direct the gas toward the downstream and therefore to fill the chamber with gas.

To measure the effectiveness of the latter embodiment, experiments on controlling the atmosphere in a chamber equipped with entry/exit devices such as those illustrated in conjunction with FIGS. 6 and 7 were carried out. The results are given in table 1 below.

| | Film speed (m/min) | | | |
|---|---|---|---|---|
| | 100 | 150 | 200 | 250 |
| Slot 1 nitrogen flow rate ($Sm^3/h$) | 10 | 10 | 10 | 10 |
| Slot 2 nitrogen flow rate ($Sm^3/h$) | 10 | 10 | 10 | 10 |

-continued

| | Film speed (m/min) | | | |
|---|---|---|---|---|
| | 100 | 150 | 200 | 250 |
| Slot 3 nitrogen flow rate ($Sm^3/h$) | 25 | 35 | 50 | 62 |
| Total flow rate ($Sm^3/h$) | 45 | 55 | 70 | 82 |
| Total volume ($Sl/m^2$) | 5.8 | 4.7 | 4.5 | 4.2 |
| Total $O_2$ (ppm) | 39 | 34 | 32 | 26 |

Slots 1 and 2 correspond to those of the entry device, while slot 3 corresponds to that of the exit device.

It should be noted in this table that both the flow rates in $Sm^3/h$ (as is conventional) and volume in $Sl/m^2$ of film treated have been indicated so as to be able to continue the comparison with the results presented earlier.

The results show that, thanks to the equipment of FIGS. 6 and 7, UV irradiation treatment may be carried out in an inert nitrogen atmosphere containing less than 40 ppm oxygen, whatever the speed, with a total volume of nitrogen between 4.2 and 5.8 $Sl/m^2$ (and therefore in general less than the volumes required within the context of the embodiment shown in FIG. 2).

In the foregoing, the invention was most particularly illustrated by examples using nitrogen, but it should be noted that it would be possible, without at any moment departing from the scope of the present invention, to use other gases or gas mixtures, and especially argon, $CO_2$, helium or mixtures thereof.

It may even be indicated that it is preferable to use $CO_2$ or mixtures containing $CO_2$, since it has been found that when $CO_2$ (as opposed to nitrogen) is used:

- the volume of gas to be used for the same performance in terms of residual oxygen content in the chamber may be reduced;
- for the same volume of gas, the residual oxygen content obtained in the chamber is reduced.

Such results are probably due to the density of $CO_2$, which is higher than that of nitrogen.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An installation in which an operation of crosslinking a coating is carried out by ultraviolet radiation or by an electron beam, in the presence of a gas mixture with a controlled residual oxygen content, the installation comprising a chamber having one or more UV lamps or a source of accelerated electrons, necessary for carrying out the crosslinking operation, wherein the installation includes an entry device adjacent to and just prior to the chamber and comprising at least the following three components: a labyrinth system, means for injecting an inert gas forming a gas knife, and a channel such that a running product passing through the entry device would first come in contact with the labyrinth system followed by the means for injecting an inert gas followed by the channel before passing to the chamber.

2. The installation of claim 1, wherein the installation includes an exit device adjacent to and just after the chamber and consisting of at least the following three components: a channel ("output channel"), means for injecting an inert gas forming a gas knife, and a means for creating a pressure drop, such as a smooth profile, the distance between the smooth profile and the surface of the coating being less than the height of said channel and the running product passing through the exit device such that the running product would first come in contact with the channel followed by the means for injecting an inert gas forming a gas knife followed by the means for creating a pressure drop before exiting the exit device.

3. The installation of claim 1, wherein the installation includes an exit device adjacent to and just after the chamber and consisting of at least the following three components: a channel, means for injecting an inert gas forming a gas knife, and a labyrinth system such that the running product passing through the exit device would first come in contact with the channel followed by the means for injecting an inert gas forming a gas knife followed by the labyrinth system before exiting the exit device.

4. The installation of claim 1, wherein said means for injecting inert gas forming a gas knife comprise a plane-walled gas injection slot emerging inside the entry or exit device in question.

5. The installation of claim 1, wherein the length/height ratio of at least one of said channels is at least 3.

6. The installation of claim 5, wherein the length/height ratio of at least one of said channels is at least 6.

7. An installation in which an operation of crosslinking a coating is carried out by ultraviolet radiation or by an electron beam, in the presence of a gas mixture with a controlled residual oxygen content, the installation comprising a chamber having one or more UV lamps or a source of accelerated electrons, necessary for carrying out the crosslinking operation, wherein the installation includes an entry device adjacent to and just before the chamber and comprising at least the following three components: a labyrinth system, means for injecting an inert gas forming a gas knife, and a channel such that a running product passing through the entry device would first come in contact with the labyrinth system followed by the means for injecting an inert gas followed by the channel before passing to the chamber, said entry device further including an additional means for injecting an inert gas and channel such that the entry device includes at least the following five components: a first channel, a first gas injection slot, a labyrinth system, a second gas injection slot, followed by a second channel such that a running product passing through the entry device would first come in contact with the first channel followed by the first gas injection slot followed by the labyrinth system followed by the second gas injection slot followed by the second channel before passing to the chamber.

8. The installation of claim 7, wherein the coating is an ink or varnish coating.

9. The installation of claim 7, wherein said means for injecting inert gas forming a gas knife comprise a plane-walled gas injection slot emerging inside the entry or exit device in question.

10. The installation of claim 7, wherein the length/height ratio of at least one of said channels is at least 3.

11. The installation of claim 10, wherein the length/height ratio of at least one of said channels is at least 6.

12. The installation of claim 7, wherein the coating is an ink or varnish coating.

13. An installation in which an operation of crosslinking a coating is carried out by ultraviolet radiation or by an electron beam in the presence of a gas mixture with a controlled residual oxygen content, the installation comprising:

a) a chamber having one or more UV lamps or a source of accelerated electrons necessary for carrying out the crosslinking operation, b) an entry device adjacent to and just prior to the chamber and comprising at least the following three components: a labyrinth system, means for injecting an inert gas forming a gas knife, and a channel, such that a running product passing through the entry device would first come in contact with the labyrinth system followed by the means for injecting an inert gas followed by the channel before passing to the chamber, and c) an exit device adjacent to and after the chamber and comprising at least the following three components: a channel, means for injecting an inert gas forming a gas knife comprising a plane-walled gas injection slot emerging inside the entry or exit device in question, and either:

i) a means for creating a pressure drop, such as a smooth profile, the distance between the smooth profile and the surface of the coating being less than the height of said channel, or ii) a labyrinth system;

such that the running product passing through the exit device would first come in contact with the channel followed by the means for injecting an inert gas forming a gas knife followed either by a means for creating a pressure drop or a labyrinth system before exiting the exit device.

14. An installation in which an operation of crosslinking a coating is carried out by ultraviolet radiation or by an electron beam in the presence of a gas mixture with a controlled residual oxygen content, the installation comprising:

a) a chamber having one or more UV lamps or a source of accelerated electrons necessary for carrying out the crosslinking operation, b) an entry device adjacent the chamber and comprising at least the following five components, seen in succession by the running product to be treated: a first channel, a first gas injection slot, a labyrinth system, a second gas injection slot, followed by a second channel, and c) an exit device adjacent the chamber and comprising at least the following three components, seen in succession by the running product to be treated: a channel, means for injecting an inert gas forming a gas knife comprising a plane-walled gas injection slot emerging inside the entry or exit device in question, and either:

i) a means for creating a pressure drop, such as a smooth profile, the distance between the smooth profile and the surface of the coating being less than the height of said channel, or ii) a labyrinth system.

* * * * *